United States Patent
Sreerama

(10) Patent No.: US 8,965,318 B2
(45) Date of Patent: Feb. 24, 2015

(54) DYNAMIC RFI DETECTION

(75) Inventor: Chaitanya Sreerama, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 218 days.

(21) Appl. No.: 13/602,819

(22) Filed: Sep. 4, 2012

(65) Prior Publication Data

US 2013/0059557 A1    Mar. 7, 2013

Related U.S. Application Data

(63) Continuation of application No. 12/217,099, filed on Jun. 30, 2008, now Pat. No. 8,280,335.

(51) Int. Cl.
*H04B 1/10* (2006.01)

(52) U.S. Cl.
CPC .................................. *H04B 1/1027* (2013.01)
USPC ........................ 455/296; 455/63.1; 455/278.1

(58) Field of Classification Search
USPC .......... 455/63.1, 278.1, 296, 283, 310, 277.1, 455/114.2
See application file for complete search history.

(56) References Cited

U.S. PATENT DOCUMENTS

| | | |
|---|---|---|
| 6,556,623 B2 | 4/2003 | Tzannes et al. |
| 6,934,340 B1 | 8/2005 | Dollard |
| 7,010,130 B1 | 3/2006 | Kinoshita |
| 7,729,457 B2 | 6/2010 | Bochkovskiy et al. |
| 7,949,345 B2 | 5/2011 | Lu et al. |
| 8,077,839 B2 | 12/2011 | Yasko |
| 2009/0004989 A1 | 1/2009 | Han et al. |
| 2009/0215443 A1 | 8/2009 | Dickey et al. |

OTHER PUBLICATIONS

Non Final Office Action Received for the U.S. Appl. No. 12/217,099, mailed on Jun. 20, 2011, 9 pages.
Non Final Office Action Received for the U.S. Appl. No. 12/217,099, mailed on Jan. 26, 2012, 10 pages.
Notice of Allowance Received for the U.S. Appl. No. 12/217,099, mailed on Jun. 1, 2012, 7 pages.

*Primary Examiner* — Sonny Trinh
(74) *Attorney, Agent, or Firm* — Jordan IP Law, LLC

(57) ABSTRACT

Provided herein are different embodiments for performing radio frequency interference (RFI) detection in electronic devices such as mobile computing systems.

20 Claims, 3 Drawing Sheets

DYNAMIC RFI DETECTION

RELATED APPLICATIONS

This application is a continuation of U.S. patent application Ser. No. 12/217,099 filed Jun. 30, 2008, entitled "DYNAMIC RFI DETECTION."

BACKGROUND

The present invention relates generally to computer platforms and in particular, to approaches for detecting radio frequency (RF) interference for enhancing wireless communications.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Provided herein are different embodiments for performing radio frequency interference (RFI) detection in electronic devices such as mobile computing systems. In some embodiments, information may be briefly sampled from a receiver during normal device operation to identify real-time environmental or internal platform RFI and to characterize the RFI, e.g., identify a noise signature (or profile) for the RFI. The noise signature can then, for example, be passed on to a host system management engine to dynamically mitigate RFI impact and improve wireless platform performance. For example, a host management engine could identify and adaptively shift the offending platform noise sources (such as computing clocks) either out of the on-channels or to a neutral position within the on-channels and negate its harmful effects.

With many electronic devices such as computers with a wireless network interface, real-time wireless traffic during receive operations is typically discontinuous and random in nature, unlike most environmental or internally generated RFI. This can be exploited to detect and distinguish the RFI from the received traffic using, for example, minimum-hold and maximum-hold operations to generate RFI and traffic profiles, respectively.

Figure 1:
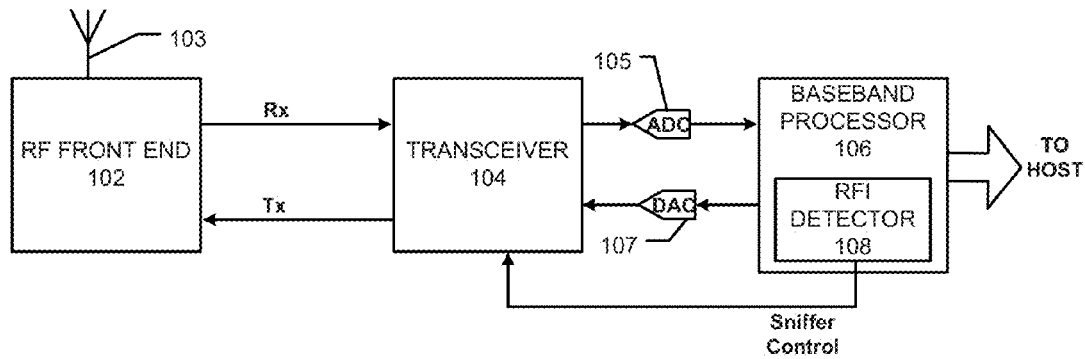
FIG. 1 is a diagram of a wireless interface having an RFI detector in accordance with some embodiments.

FIG. 1 is a diagram showing a wireless interface device (e.g., a wireless network interface module) for coupling an electronic device such as a computer to a wireless network using a suitable methodology including but not limited to WiFi, WiMax, or the like. The depicted wireless interface generally comprises an RF front-end, 102, one or more antennas 103, transceiver 104, at least one A-to-D converter (ADC) 105, at least one D-to-A converter (DAC) 107, and a baseband processor 106, coupled together as shown. It may support one or several different interface protocols to communicatively link a host (e.g., a processor in a computer) wirelessly to a network.

In this embodiment, the baseband processor has an RFI detector to identify and characterize RFI in accordance with the approaches discussed herein. The RFI detector uses the receiver portion of the interface. It controls so-called "sniffer" functionality to collect blocks of RF data, process it and generate from it RFI and data traffic profiles. It can do this during normal transmit/receive activity. (It should be appreciated that an RFI detector, as taught herein, may also be implemented elsewhere in the platform including but not limited to within the host itself.)

Figure 2:
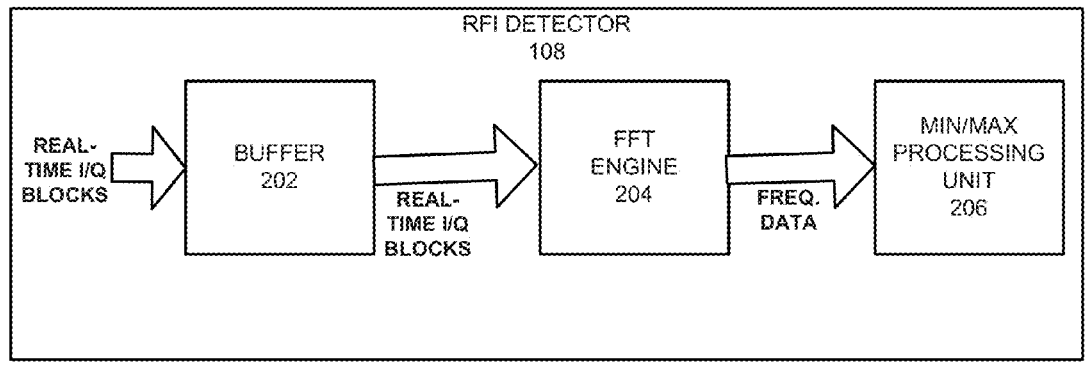
FIG. 2 is a diagram of an RFI detector in accordance with some embodiments.
Figure 3A:
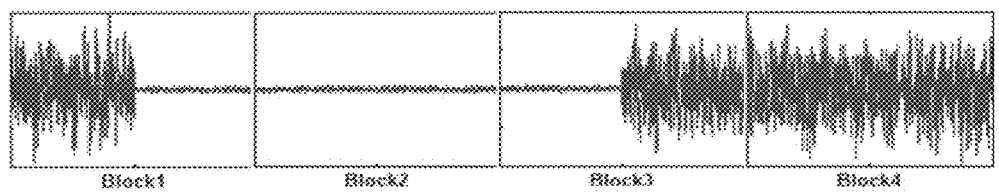
FIG. 3A to 3C are signal diagrams illustrating RFI detection in accordance with some embodiments.

FIG. 2 is a diagram showing an RFI detector in accordance with some embodiments. The RFI detector generally comprises a buffer 202, a fast Fourier transform (FFT) engine 204, and a min./max. processing unit 206. The buffer 202 may comprise any suitable memory to store blocks of I and Q information collected from the receiver, e.g., from the A-to-D converter 105 from FIG. 1. The data is collected in blocks, e.g., two or more 20 μSec. blocks dictated by the sampling rate of the receiver, each including a number (e.g., 512) time-domain samples from the incoming traffic channel. FIG. 3A graphically depicts an exemplary, continuous real-time capture of data sampled into four blocks.

Figure 3B:
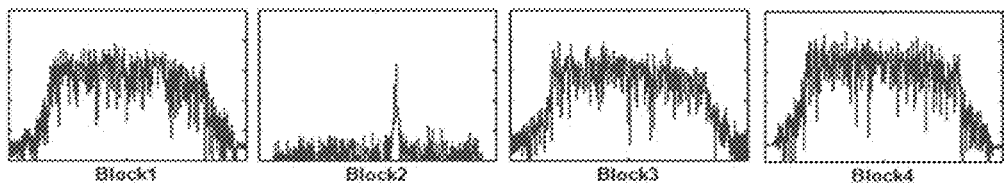

The FFT engine may be implemented with any suitable combination of hardware and software to convert the collected time-domain data into frequency-domain information. This is graphically represented in FIG. 3B, which shows the blocks from FIG. 3A converted into frequency information using an FFT methodology. In this example, the data is collected into 20 μSec blocks of 512 samples in each block. It should be appreciated that any suitable algorithm for performing a discrete Fourier transform (DFT), especially those to perform FFT, which is an efficient way to compute DFT, may be employed. Suitable FFT methods include but are not limited to Split-radix, Prime-factor, Bruun's, Rader's, and Bluestein's FFT algorithms to mention just a few.

Figure 3C:
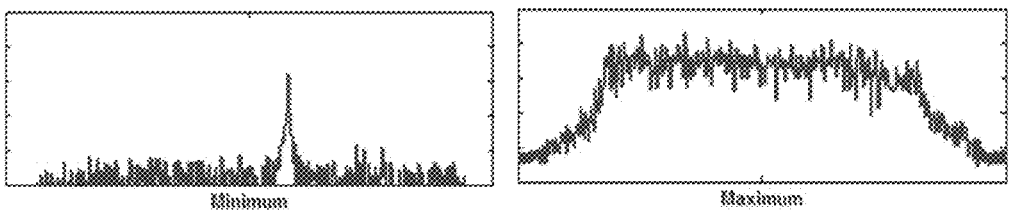

The data minimum and maximum processing unit 206 processes the frequency information to obtain minimum and maximum profiles to distinguish RFI from signal traffic. This is represented in FIG. 3C for the processed blocks of FIGS. 3A and 3B. Any suitable approach may be used for obtaining these profiles. For example, min. hold and max. hold operations, whereby the smallest and largest value, respectively, for each block increment, is retained, could be employed to generate the min. and max. profiles. Other operations could be used. For example, averaging could also be used to generate a min. profile. With averaging, the values from the different blocks for each increment in the block are averaged to derive a resultant value for that block increment. Averaging operations may work well for methodologies using larger numbers of blocks and/or where blocks are collected over a relatively wide time frame. For example, some receivers may make available spaced apart blocks, e.g., every $n^{th}$ block.

Min. and max profiles can be used to characterize RFI, as well as the traffic signal itself. The min. profile corresponds to the RFI, while the max. profile corresponds to the traffic signal.

Figure 4:
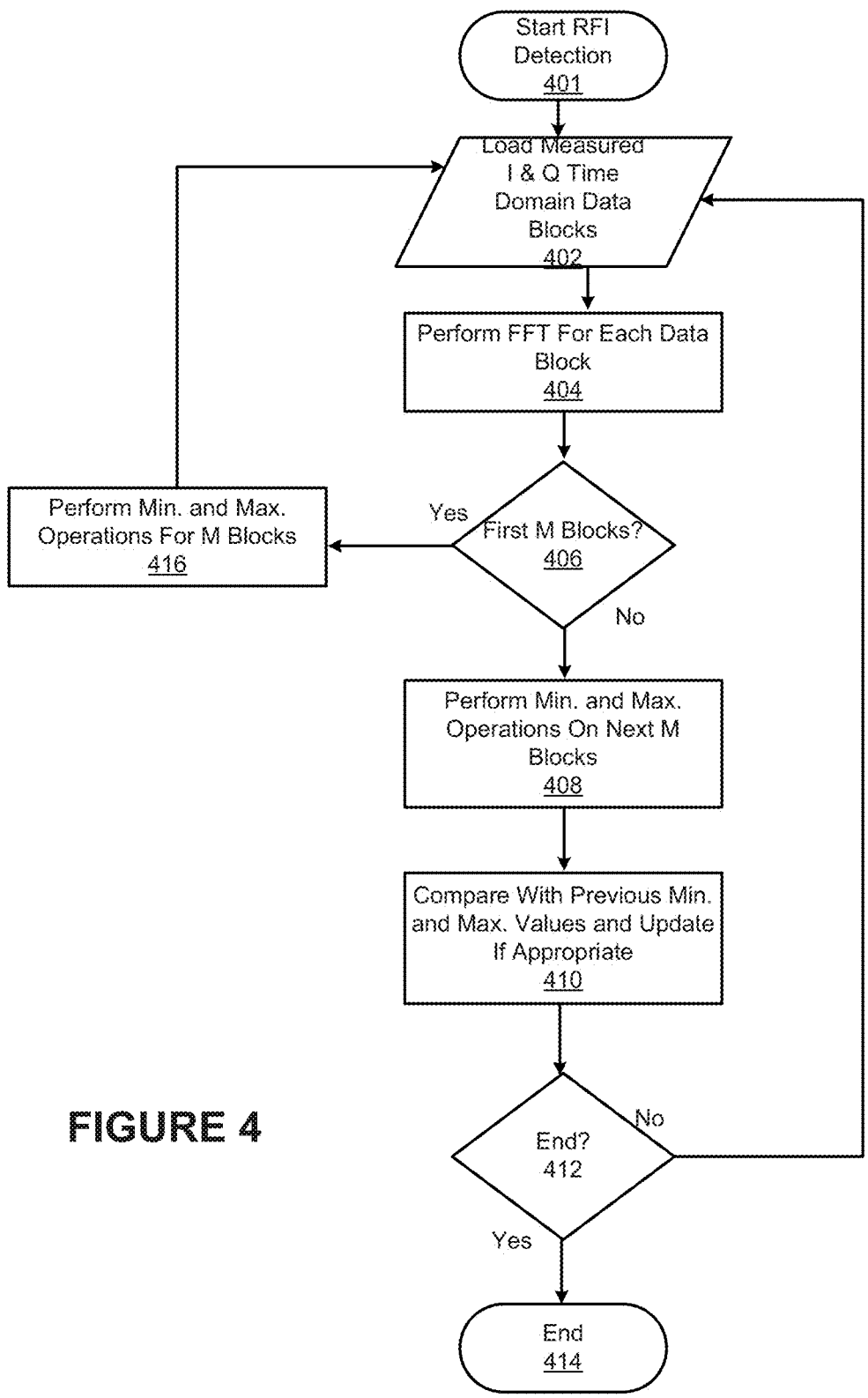
FIG. 4 is a flow diagram of a routine for detecting RFI in accordance with some embodiments.

FIG. 4 is a flow diagram showing a routine 401 for detecting RFI as discussed herein. At 402, M blocks of measured I and Q time domain data is loaded for processing by the FFT engine. The value of M could be any number and will typically depend on trade-offs between accuracy and efficiency, as well as on the implemented sniffer methodology. With the exemplary graphs of FIGS. 3A to 3C, for example, M was four. (Note that this routine works for different sniffer approaches. The sniffer may capture X blocks every time it is activated based on its memory allocation. Alternatively, it may capture information for a specific duration in time every time it is activated and process information simultaneously, making it both time and memory efficient, or it may be activated and start capturing information that is processed simultaneously until both the RFI and data transmission profiles are detected. This latter approach is energy-efficient in addition to being time and memory-efficient.)

At 404, the data blocks are converted from the time to the frequency domain using a FFT method. At 406, it determines if the M blocks are the first M blocks. If so, the routine proceeds to 416 and performs min. and max. operations on the frequency domain blocks to generate min. and max. profiles and then loops back to 402.

At 406, if the M blocks are not the first M blocks (i.e., min. and max. profiles have already been generated), it goes to 408 to perform min. and max. operations on the current blocks. A 410, it then compares the current min. and max. values with the previous ones for each block increment and updates the min. and max profiles if appropriate. That is, if the new min. value for a block increment is smaller than the previous one, it makes this newer value the min. value in the min. profile. At 412, it determines if it is to end. If not, it loops back to 402. Otherwise, it ends at 414.

Note that this routine can be used in a flexible manner. For example, in some systems, receivers are provided that have sniffer functionality whereby a certain number of blocks or skipped blocks, etc. are made available in response to sniffer invocation. With this in mind, it should be appreciated that the steps in this routine, e.g., describing loading blocks or the decision step regarding the first M blocks, are meant to cover any group of blocks, regardless of whether they are sequentially adjacent, spaced apart, covering large or small time spans, etc.

This invention has the advantage of dynamic monitoring of a wireless channel for RFI and the capability to minimize the impact of RFI upon the channel. The SNR information obtained from the noise-detection algorithm can be directly used as an active-channel penalty function in the RFI-ME mitigation algorithms for computing their real-time noise impact.

The undesired RF emission or radio frequency interference (RFI) can be identified in conjunction with nominal receiver operation or a dedicated operation through the use of little information (2 blocks of I & Q data) in memory for identification/detection of RFI, making it time, power, and memory efficient.

Figure 5:
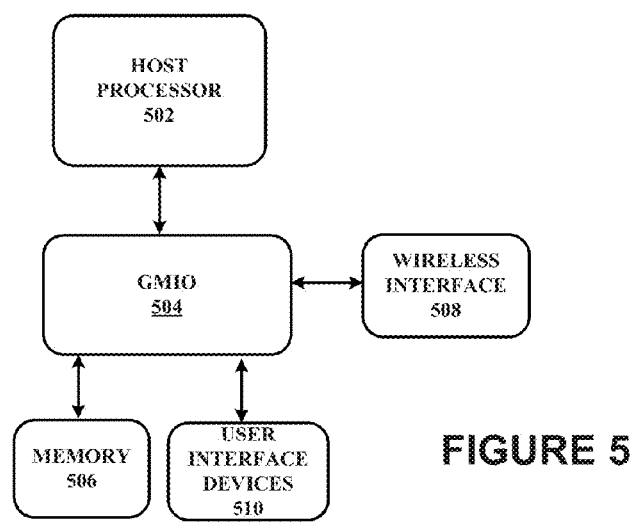
FIG. 5 is a block diagram of a computer system having an RFI detector in accordance with some embodiments.

With reference to FIG. 5, one example of a portion of a computing platform (e.g., computing system such as a mobile personal computer, PDA, cell phone, or the like) is shown. The represented portion comprises one or more processors 502, graphics/memory/input/output (GMIO) control 504, memory 506, wireless interface 508, and user interface devices 510. The processor(s) 502 is coupled to the memory 506, wireless interface 508, and user interface devices 510 through the GMIO control 504. The GMIO control 504 may comprise one or more blocks (e.g., chips or units within an integrated circuit) to perform various interface control functions (e.g., memory control, graphics control, I/O interface control, and the like. These circuits may be implemented on one or more separate chips and/or may be partially or wholly implemented within the processor(s) 502.

The memory 506 comprises one or more memory blocks to provide additional random access memory to the processor(s) 502. It may be implemented with any suitable memory including but not limited to dynamic random access memory, static random access memory, flash memory, or the like. The wireless interface 508 wirelessly couples the processor(s) 502 to a wireless network (not shown). It may be implemented with a wireless interface such as that described in FIG. 1. It may include an RFI detector, or alternatively, the RFI detector may be implemented across different blocks including the processor and wireless interface. The user interface devices 510 comprises one or more devices such as a display, keypad, mouse, etc. to allow a user to interact with and perceive information from the computing platform.

The computing platform may implement a variety of different computing devices or other appliances with computing capability. Such devices include but are not limited to laptop computers, notebook computers, personal digital assistant devices (PDAs), cellular phones, audio and/or video media players, desktop computer, servers, and the like. It could constitute one or more complete computing systems or alternatively, it could constitute one or more components useful within a computing system.

With embodiments discussed herein, the min. and max. profiles may be used in a variety of ways. As mentioned already, min. profiles can be used to mitigate RFI. Max. profiles, which correspond to the traffic data signal, can be used, for example, to generate signal to noise ratios (SNR) or the like. For example, SNR information can be directly used as an active-channel penalty function in the RFI-ME mitigation algorithms to assess the impact of RFI on the channel for cost analysis.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An electronic device, comprising:
   a buffer to store real-time data from a receiver, wherein the data is collected in blocks;
   a fast Fourier transform engine to convert the data from a time domain data into frequency domain data; and
   a processing unit to process the frequency domain data to generate a minimum profile and a maximum profile, wherein the processing unit distinguishes a radio frequency interference from a signal traffic.

2. The electronic device of claim 1, wherein the minimum profile and maximum profile may be used to characterize the radio frequency interference and the signal traffic.

3. The electronic device of claim 2, wherein the minimum profile corresponds to the radio frequency interference.

4. The electronic device of claim 3, wherein the minimum profile is generated via a minimum hold operation.

5. The electronic device of claim 3, wherein the minimum profile is generated via an averaging operation.

6. The electronic device of claim 2, wherein the maximum profile corresponds to the signal traffic.

7. The electronic device of claim 6, wherein the maximum profile is generated via a maximum hold operation.

8. A method comprising:
   storing, via a buffer, real-time data from a receiver, wherein the data is collected in blocks;
   converting, via a fast Fourier transform engine, the data from a time domain data into frequency domain data; and
   processing, via a processing unit, the frequency domain data to generate a minimum profile and a maximum profile, wherein the processing unit distinguishes a radio frequency interference from a signal traffic.

9. The method of claim 8, further comprising characterizing the radio frequency interference and the signal traffic using the minimum profile and maximum profile.

10. The method of claim 9, wherein the minimum profile corresponds to the radio frequency interference.

11. The method of claim 10, wherein the minimum profile is generated via a minimum hold operation.

12. The method of claim 10, wherein the minimum profile is generated via an averaging operation.

13. The method of claim 9, wherein the maximum profile corresponds to the signal traffic.

14. The method of claim 13, wherein the maximum profile is generated via a maximum hold operation.

15. A computer system, comprising:
    a processor;
    a wireless interface, in communication with the processor, to wirelessly link the processor to a network; and
    an radio frequency interference detector including:
      a buffer to store real-time data from a receiver, wherein the data is collected in blocks;
      a fast Fourier transform engine to convert the data from a time domain data into frequency domain data; and
      a processing unit to process the frequency domain data to generate a minimum profile and a maximum profile, wherein the processing unit distinguishes a radio frequency interference from a signal traffic.

16. The computer system of claim 15, wherein the radio frequency interference detector is implemented in the wireless interface.

17. The computer system of claim 15, wherein the radio frequency interference detector is implemented at least partially in the processor.

18. The computer system of claim 15, wherein the minimum profile and maximum profile may be used to characterize the radio frequency interference and the signal traffic.

19. The computer system of claim 18, wherein the minimum profile corresponds to the radio frequency interference and is generated via an averaging operation.

20. The computer system of claim 18, wherein the maximum profile corresponds to the signal traffic and is generated via a maximum hold operation.

* * * * *